Figure 1:
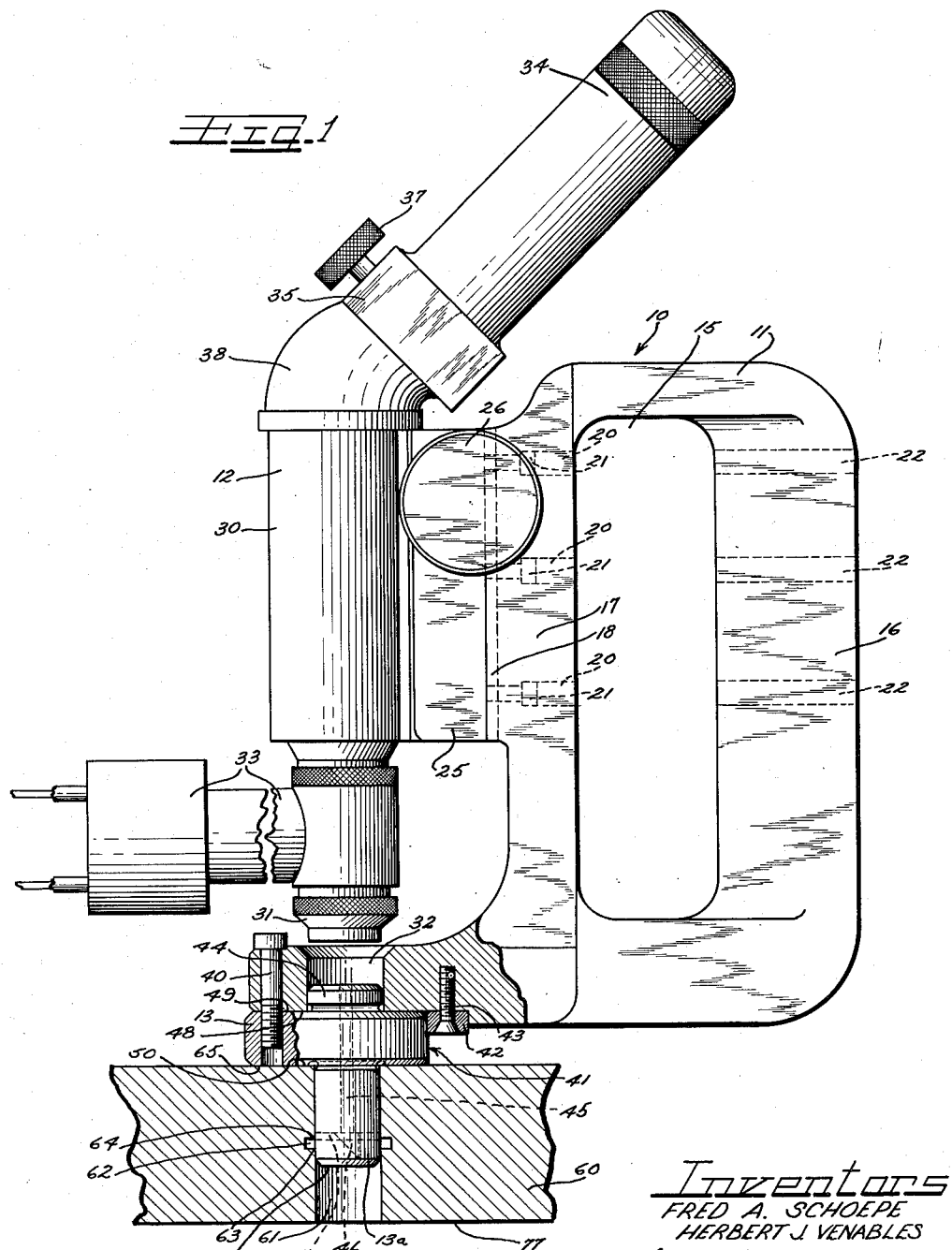

May 16, 1961 F. A. SCHOEPE ET AL 2,984,147
MEANS FOR OPTICAL GAGING
Filed March 15, 1957 2 Sheets-Sheet 2

Inventors
FRED A. SCHOEPE
HERBERT J. VENABLES
By Hill, Sherman, Meroni, Gross & Simpson
Attys United States Patent Office 2,984,147
Patented May 16, 1961

2,984,147
MEANS FOR OPTICAL GAGING
Fred A. Schoepe and Herbert J. Venables, Cleveland, Ohio, assignors to Thompson Ramo Wooldridge Inc., a corporation of Ohio
Filed Mar. 15, 1957, Ser. No. 646,446
6 Claims. (Cl. 88—14)

This invention relates to a mass machining production inspection method and means utilizing optical measurements and more particularly to a means for determining the location of a discontinuity within a hole in an object. More specifically, the means of this invention effects the inspection of machined grooves or recesses within the interior of a confined space such as a circumferential groove in the walls of a hole.

In the manufacture, gaging, and inspection of parts having a hole therein, it is frequently necessary to determine the distance from a reference surface to a discontinuity within such hole, for example a recess in the walls of the hole or the shoulder at opposite sides of the recess. In quantity precision machining, objects having holes of a given diameter and depth are frequently provided with one or more annular recesses cut in the wall defining the hole. The specific longitudinal location of that recess must be determined within extremely close tolerances. Conventional gages, such as Go and No-Go Template Type Feeler Gages, and Go and No-Go Turn Type Gages are incapable of indicating the degree of error with respect to the longitudinal position of the recess in the walls of the hole.

By the invention disclosed herein, it is possible to gage the position of grooves on the inside of holes, determining not only the acceptability of the part, but also the dimension present, whether acceptable or unacceptable. This invention contemplates the use of an optical system which reflects the image of a groove-defining shoulder or other surface discontinuity within the hole to a calibrated standard. Thus a direct reading instrument is provided which yields the desired information conveniently and simply.

Accordingly, it is an object of the present invention to provide a means of gaging the location of predetermined surface irregularities within holes.

It is a further object of this invention to provide a means for gaging the location of surface irregularities within any size hole, such irregularity being located anywhere within the length of such hole.

It is a further object of this invention to measure directly the location of a surface irregularity within an opening in an object.

Yet another object is the provision of an adapter for a microscope, whereby measurements interior of a hole may be made optically.

A still further object is the provision of a new and improved optical gage.

Other objects, features and advantages of the instant invention will be apparent from the following detailed description of the attached sheets of drawings, which illustrate the invention.

Figure 2:
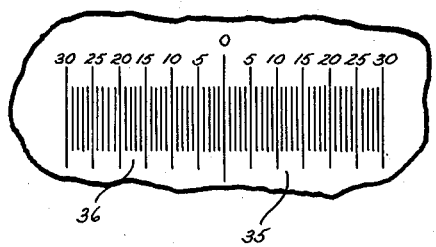
Figure 3:
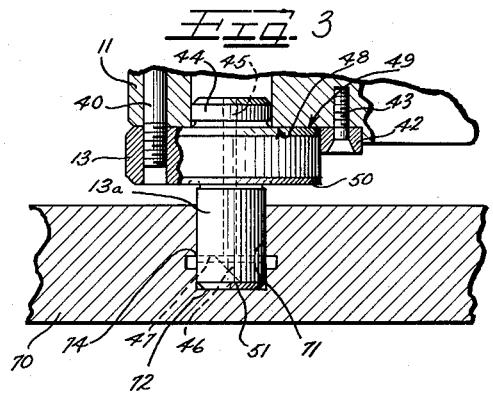
Figure 4:
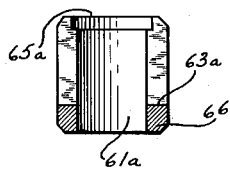
Figure 5:
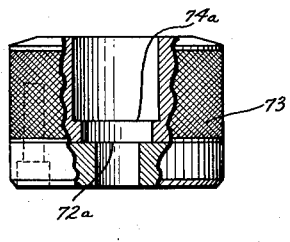

On the drawings:
Figure 1 is a side elevational view, partly in section, showing an optical gage according to this invention, associated with an object being gaged.
Figure 2 is a fragmentary view of a calibrated reticle comprising one of the components of the gage of Figure 1.
Figure 3 is a fragmentary view showing the gage of Figure 1 associated with a blind hole in an object to be gaged.
Figure 4 illustrates a master gage for use with the gage of Figure 1 when the surface adjacent to the mouth of the opening is used as a reference.
Figure 5 illustrates a master gage to be used with the gage of Figure 1 to set the gage when the dimension to be checked is referenced with respect to the bottom of a hole; and
Figures 6, 7 and 8 each illustrate various ways in which the adapter of gage 1 may be varied in accordance with our invention.

As shown on the drawings:
Referring to Figure 1, there is shown at 10 a gage or an inspection device which may be utilized for determining the accuracy of a manufacturing operation by optical measurements. The gage 10 includes a base 11, a microscope 12, and an adapter 13. For purposes of identification we refer herein to a "microscope," using such term in a generic sense to designate any enlarging instrument including a so-called "macroscope."

The base 11 has a gripping or carrying portion 16 with large hand opening 15 formed therein. At one edge the base 11 has a boss or projection forming a bracket or microscope attaching portion 17. A suitable coupling or fastening means interconnects the microscope and the bracket, for example, vertical dovetail 18 is provided on the bracket 17. The base 11 also has in its microscope attaching portion 17, a series of threaded openings 20, 20, 20 each receiving a locking screw 21 which is axially positionable in the opening 20. If desired, additional openings 22 may be provided aligned with each of openings 20 to make access to the heads of screws 21 by conventional tools somewhat easier.

The microscope 12 includes a mounting portion 25 which is also dovetailed and which engages with the dovetail 18. Thus it can be seen that the screws 21 may be selectively positioned as to apply a slight drag against mounting portion 25, to apply a desired amount of locking force against mounting portion 25. The attaching portion 17 also includes guide means which by way of example comprises a vertical adjusting knob 26 to which is connected a pinion (not shown) which may engage a rack carried by mounting portion 25 within the dovetail 18. The specific details of the vertical or reciprocable adjustability feature are not necessary to an understanding of the invention.

The microscope 12 further includes a body 30 which is secured to the mounting portion 25. At the lower end of microscope 12, there is an objective lens assembly 31 which registers with an opening 32 in the base 11. Intermediate the objective 31 and the body 30, there may be a vertical illuminator 33 wherein a transformer supplies low voltage current to a light bulb. Light from the bulb is directed to a half-silvered mirror mounted so as to transmit light through the objective 31 and the opening in the base 32. The structural details of the illuminator are not necessary to an understanding of the invention. At the opposite end of the microscope, there is an eyepiece 34. The eyepice may be a Huygens type or Huygenian or any other suitable structure, for example, the eyepiece illustrated here is known as a Ramsden eyepiece. This eyepiece has a plano-convex lens adjacent to the eye of the user, the convex surface being inwardly directed, and has a plano-convex field lens located inwardly from the eye lens. The convex surface of the field lens is directed toward the eye. Intermediate the eyepiece 34 and the body 30, there is an adjustable reticle 35. The reticle 35 consists of a transparent element such as a disc on which there is provided a calibrated scale, a typical scale being shown in Figure 2 at 36. Of course, any other scale which has convenient units, dimensions, or limits, may be utilized in place of the scale illustrated herein. Proper relative axial positioning of the eye lens with respect to the field lens of the eyepiece causes the scale 36 to appear in sharp focus beyond the eyepiece. In the instant form of this invention, the reticle scale 36 is therefore maintained at a fixed distance from the field lens of the eyepiece. The reticle scale 36 is however preferably translationally or radially adjustable with respect to the eyepiece by a mechanism and through knob 37 for a purpose presently to be explained. In a Huygens type or Huygenian eyepiece, the field lens is turned 180° so that its plane side is directed toward the convex side of the eye lens. Accordingly, if that type of eyepiece is utilized, the reticle 35 will be located intermediate the eye lens and the field lens.

Intermediate the microscope body 30 and the adjustable reticle 35, there is shown an inclined eyepiece holder 38 which preferably also includes an erecting prism, thereby avoiding image reversal and permitting the inexperienced operator to more easily learn the use of the gage.

The base 11 also includes an adapter 13 rigidly secured thereto as by one or more screws 40 extending through a portion of the base and engaging the adapter 13. The adapter 13 is removably integrated with the base, for maximum flexibility and economy. The adapter 13 is shown here as being generally circular and having one carefully dimensioned flat edge 41 which engages a key 42 carried by and secured to the base 11 thereby indexing or locating the adapter 13 with respect to the base 11. The key 42 may be integral with the base 11 or may be detachable, as shown, and secured by any convenient fastening means such as one or more screws 43.

The adapter 13 has a pilot portion 44 which extends into the opening 32 in base 11, snugly and removably engaging said opening. Further, the adapter 13 has an opening 45 which is aligned with the microscope objective 31 and which extends lengthwise of the adapter 13 into a protruding portion 13a thereof. This opening may be a hole, or may be a groove extending from one side of the adapter. Adjacent to the distal end of the opening 45, there is provided a reflecting means herein illustrated as a reflecting prism 46. The prism 46 is a total reflecting prism having a reflecting surface or reflector which is external to the microscope, but optically aligned therewith and also optically aligned with a discontinuity such as a predetermined groove to be gaged. The reflecting means 46 is secured in place in a transverse groove 47 for example, by cementing.

Surface 48 is carefully finished, such as by grinding to engage with the corresponding surface 49 of the base 11. Further, either or both of surfaces 50 and 51 are reference surfaces, and should be carefully finished when so used.

In the mode of operation herein illustrated a workpiece or object 60 has a hole 61, and an annular recess 62 defined by shoulders 63 and 64, one or both of which are dimensioned with respect to a reference surface 65.

The optical gage is first inserted into a master gage such as illustrated in Figure 4 in the manner shown in Figure 1. It will be seen that the master gage 66 has an opening 61a corresponding to opening 61, a reference surface 65a corresponding to reference surface 65, and a calibrating shoulder 63a corresponding to shoulder 63 or 64. This type of gage may be comparatively easily manufactured and inspected, the dimension between surfaces 63a and 65a being carefully controlled as a master dimension for the equivalent dimension to be measured in the object or workpiece 60. First the eyepiece is focused on the reticle and light is directed into the opening 61a. Of course reference surface 50 is in engagement with reference surface 65a. Knob 26 is then adjusted to focus the microscope on the predetermined discontinuity 63a, whereupon knob 37 is adjusted so as to translate the reticle scale 36 to a convenient starting point, such as having the zero on the scale of Figure 2 coincide with the image cast by the edge 63a. At this point, if desired, the screws 21 may be tightened. This procedure calibrates the gage which is now ready for use. The gage thereafter is inserted in the opening 61 as shown in Figure 1. It can be seen that if the internal discontinuity is located from the reference surface 65 the same distance that the discontinuity 63a is located from the reference surface 65a, the image of the internal discontinuity in hole 61 will appear at the same point on the reticle scale 36. On the other hand, if the internal discontinuity is present at a higher or lower position, the image will be reflected by a different point on the reflecting means 46 and hence the image will appear at a different point on the reticle scale 36 which may indicate either the dimension directly or may indicate the amount by which the workpiece is different from the master gage.

Referring to Figure 3, there is illustrated the operation of the gage of Figure 1, but with a workpiece 70 having a blind hole 71. The gage of Figure 1 may be calibrated for this type of use by means of a master gage such as is illustrated in Figure 5. Referring to Figures 3 and 5, it can be seen that the reference surface 51 of the gage is brought into engagement with a reference surface 72 or 72a respectively. The master gage 73 of Figure 5 has a discontinuity or surface 74a which corresponds to a shoulder 74 in the workpiece 70 which is to be gaged. The distance between the reference surface 72a and the surface 74a is carefully controlled to be equal to that desired for the equivalent distance in the workpiece 70. Thus, in a similar manner, the optical gage may be adjusted to the reference mark 74a, and the reticle position may be aligned with the image created thereby, for comparison with the images to be produced by articles such as 70.

It can readily be seen that if a groove is to be dimensioned from a surface such as 77 in Figure 1, the gage needs merely to be reversed and inserted from the opposite side. Should this be impractical, an auxiliary flat plate may be placed against surface 77 so as to simulate reference surface 72 shown in Figure 3, the measurement thereafter being made in the manner shown in Figure 3.

It is thus apparent that the surface 50 must be carefully finished when the gage is to be used in the manner shown in Figure 1. When the gage is to be used in the manner shown in Figure 3, surface 51 must be carefully finished. In certain instances, it is also possible that both surfaces may be finished so that a given adapter may be used in either manner.

Figure 6:
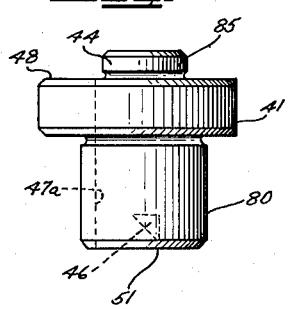
Figure 7:
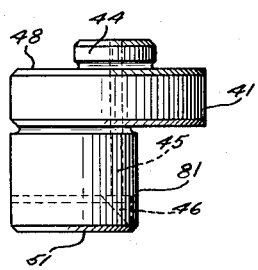
Figure 8:
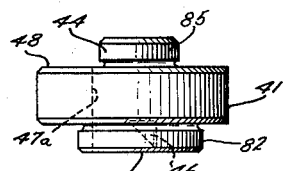

In Figures 6, 7 and 8 several varied embodiments are applied to the basic adapter 13. The differences between the adapters can best be appreciated when they are examined together. In Figure 1, the adapter 13 is shown engaging a hole 61 which has a diameter less than that of hole 32 in the base. The adapters shown in Figures 6, 7 and 8 each having a projecting portion 80, 81, and 82 respectively which have diameters which exceed that of the opening 32 in the base 11. Further, the projections 13a, 80 and 82 are each shown as being concentric with pilot portion 44 and the opening 32, while the projection 81 is somewhat eccentric from the pilot portion 44. By making the projection 81 eccentric, a shorter optical path in a horizontal direction is produced, thereby enabling the projection 81 to be made somewhat longer for insertion into a deeper hole. Also, Figure 8 illustrates that the projection 82 may be rather shallow compared to the depth of the hole. Still further, projections 80 and 82 illustrate that the groove 47 in which the prism 46 is cemented, may extend from surface 51 to surface 85 and from one side of the adapter to the groove bottom 47a.

Any one of the embodiments shown herein may be directly used to measure the distance between a pair of groove-defining shoulders, providing the calibrated reticle extends a sufficient distance. When so used, no master gage is required.

Variations in the location of the internal discontinuity in the workpiece may extend in an axial or longitudinal direction. Also the reflecting means must transmit images of such discontinuity, the variations in the location of such images falling along the linear length of the retile scale 36. Therefore, it is highly desirable that indexing as by key 42 be utilized to insure measurement of actual dimensions rather than a function of such dimensions.

It will be understood that modifications and variations may be effected without departing from the spirit and scope of the novel concepts of the present invention.

We claim as our invention:

1. In a gage for measuring the axial location of a surface discontinuity within a hole in an article, said gage including a base which adjustably carries a microscope, the improvement of means rigidly carried by the base and adapted for insertion into the hole; a reticle having a calibrated scale thereon movably carried within the microscope; and a single reflecting means rigidly carried by said first named means, said reflecting means being externally optically aligned with the microscope and the discontinuity; said reticle being radially adjustable with respect to the microscope and transversely to the stationary image of the discontinuity, whereby an image of the discontinuity may be viewed with respect to a selected portion of the reticle.

2. An optical distance measuring gage comprising in combination: a microscope; a base on which said microscope is adjustably disposed and supported; manually rotatable means for adjusting the position of said microscope with respect to said base; a single reflecting surface; means supporting said single reflecting surface adjacent to and exteriorly of said microscope, said means being adapted to be received within a hole in an object to be measured and with said microscope being entirely exterior to the object, said means optically aligning said single reflecting surface with said microscope; and calibrated distance measuring means operatively associated with said microscope; whereby the location of a surface discontinuity within the object may be measured.

3. An optical distance measuring gage for directly measuring an axial dimension of a surface discontinuity within a hole in an article, comprising in combination: a generally U-shaped base; a single total reflecting means fixedly carried by one leg of said U-shaped base and protruding therefrom in a direction normal to both of said legs and extending away from both of said legs for being inserted into the hole; a microscope having an optical axis coaxial with said direction; means securing said microscope to the other leg of said U-shaped base in a manner wherein its position may be selectively adjusted as a unit with respect to said base along said optical axis; said microscope having a reticle comprising a calibrated scale; and means within the microscope for supporting said reticle in such manner that said reticle may be adjusted radially with respect to the microscope and transversely in relation to a stationary image of the discontinuity, whereby relative alignment therebetween may be selected.

4. An adapter for a reticled adjustable microscope having an objective lens and a supporting base, said adapter including means for removably securing said adapter to the base adjacent to but axially spaced from the objective lens; an axially directed reference surface on said adapter and engageable with an object to be gaged; means on said adapter defining a projection for snug insertion into a hole in the object; a single reflecting means carried by said projection defining means in fixed relation to said reference surface for transmitting an image of a discontinuity from within the hole into the microscope for measurement by the reticle thereof, thereby measuring and indicating the axial location of the discontinuity with respect to said reference surface; and means indexing said adapter to direct said single reflecting means in a fixed selected radial direction from the axis of the objective lens.

5. An adapter for a reticled adjustable microscope having an objective lens and a supporting base, said adapter including means for securing said adapter to the base adjacent to the objective lens; an axially directed reference surface on said adapter and engageable with an object to be gaged; means on said adapter defining a projection for snug insertions into a hole in the object; and a reflecting means carried by said projection defining means in fixed relation to said reference surface and immediately adjacent to one edge of said projection defining means for transmitting an image of a discontinuity from within the hole at a point immediately adjacent to the reflecting means into the microscope for comparison with the reticle thereof, thereby measuring and indicating the axial location of the discontinuity with respect to said reference surface.

6. An adapter for a reticled adjustable microscope having an objective lens and a supporting base, said adapter including in combination: a body; means for removably securing said adapter body to the base adjacent to the objective lens; an axially directed reference surface on said adapter body and disposed for engagement with an object to be gaged; means on said adapter body defining a projection for snug insertion into a hole in the object; and a single reflecting means carried by said projection defining means in fixed relation to said reference surface for transmitting an image of a discontinuity from within the hole into the microscope for measurement by the reticle thereof, for thereby measuring and indicating the axial location of the discontinuity with respect to said reference surface.

References Cited in the file of this patent

UNITED STATES PATENTS

| | | |
|---|---|---|
| 740,827 | Driver et al. | Oct. 6, 1903 |
| 740,975 | Driver et al. | Oct. 6, 1903 |
| 1,775,452 | Fisher | Sept. 9, 1930 |
| 1,947,729 | Morrison | Feb. 20, 1934 |
| 2,196,922 | Hybarger | Apr. 9, 1940 |
| 2,341,745 | Silverman et al. | Feb. 14, 1944 |

FOREIGN PATENTS

| | | |
|---|---|---|
| 570,022 | Great Britain | June 19, 1945 |